United States Patent
Nakajima (10) Patent No.: US 11,402,600 B2
(45) Date of Patent: Aug. 2, 2022

(54) LENS UNIT

(71) Applicant: NIDEC SANKYO CORPORATION, Nagano (JP)

(72) Inventor: Tomoaki Nakajima, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 232 days.

(21) Appl. No.: 16/545,408

(22) Filed: Aug. 20, 2019

(65) Prior Publication Data

US 2020/0064582 A1 Feb. 27, 2020

(30) Foreign Application Priority Data

Aug. 23, 2018 (JP) .............................. JP2018-156182

(51) Int. Cl.
*G02B 7/02* (2021.01)

(52) U.S. Cl.
CPC .................................. *G02B 7/021* (2013.01)

(58) Field of Classification Search
CPC ................................. G02B 3/00; G02B 7/021
USPC ............................................... 359/811–830
See application file for complete search history.

(56) References Cited

U.S. PATENT DOCUMENTS

| | | | |
|---|---|---|---|
| 2005/0207034 A1* | 9/2005 | Kimura | G02B 7/022 359/819 |
| 2011/0043934 A1* | 2/2011 | Sun | G03B 3/02 359/824 |

FOREIGN PATENT DOCUMENTS

| | | | |
|---|---|---|---|
| JP | 2006284789 A | * | 10/2006 |
| JP | 2017053932 A | * | 3/2017 |
| JP | 2017053932 A | | 3/2017 |

\* cited by examiner

*Primary Examiner* — Mahidere S Sahle
(74) *Attorney, Agent, or Firm* — Cantor Colburn LLP (57) ABSTRACT

A lens unit may include a plurality of lenses; and a lens barrel comprising an inner cylindrical portion in which the plurality of lenses are housed, an outer cylindrical portion separated radially outwardly from the inner cylindrical portion, and a plurality of ribs extending in a radial pattern from an outer circumferential surface of the inner cylindrical portion toward an inner circumferential surface of the outer cylindrical portion. A plurality of axis alignment protrusions protruding radially inwardly may be provided on an inner circumferential surface of the inner cylindrical portion. Each of the plurality of axis alignment protrusions may be formed between adjacent ribs among the plurality of ribs.

5 Claims, 13 Drawing Sheets

LENS UNIT

CROSS REFERENCE TO RELATED APPLICATION

The present application claims priority under 35 U.S.C. § 119 to Japanese Application No. 2018-156182 filed Aug. 23, 2019, the entire content of which is incorporated herein by reference.

BACKGROUND

Field of the Invention

At least an embodiment of the present invention relates to a lens unit, and pertains to, for example, a lens unit including a plurality of lenses and a lens barrel configured to hold the lenses.

Background

In recent years, requirements for optical characteristics of an entire lens unit become more demanding, and improvement of the accuracy of lenses has been required. For example, the technique to improve the roundness accuracy of an inner circumferential surface of a lens barrel has been proposed, the technique being such that the lens barrel is structured to include an inner cylindrical portion and an outer cylindrical portion formed on the outer side of the inner cylindrical portion via a circumferential groove, and the occurrence of resin sinks is prevented and the roundness is improved by reducing the thickness by the circumferential groove (see, for example, Japanese Unexamined Patent Application Publication No. 2017-53932). In the technique, a plurality of ribs are formed in a radial pattern between the inner cylindrical portion and the outer cylindrical portion so as to connect the inner cylindrical portion and the outer cylindrical portion. Further, a plurality of protrusions (axis alignment protrusions) are formed on an inner circumferential surface of the inner cylindrical portion circumferentially at equal intervals. The protrusions are provided as a lens axis alignment function and thus reduce lens distortion at the time of press-fitting a lens into the lens barrel.

Incidentally, according to the technique described in Japanese Unexamined Patent Application Publication No. 2017-53932, the roundness of the inner cylindrical portion of the lens barrel serving as a lens housing portion is improved, and thus the high performance of the lens unit can be attained. However, distortion may occur depending on the shape of the lens barrel, and while the higher performance of the lens unit is required, an influence of such distortion needs to be inhibited and thus another technique is required even when the distortion is conventionally within an allowable range.

SUMMARY

At least an embodiment of the present invention is thus made in view of the above situation and provides a technique for a lens unit that is provided with a lens barrel including an inner cylindrical portion and an outer cylindrical portion, wherein, if axis alignment protrusions are provided on an inner circumferential surface of the inner cylindrical portion, an influence on the axis alignment protrusions at the time of molding the lens barrel can be inhibited and high resolution of the lens unit can be attained.

A lens unit according to at least an embodiment of the present invention includes: a plurality of lenses; and a lens barrel including an inner cylindrical portion in which the plurality of lenses are housed, an outer cylindrical portion separated radially outwardly from the inner cylindrical portion, and a plurality of ribs extending in a radial pattern radially outwardly from an outer circumferential surface of the inner cylindrical portion. A plurality of axis alignment protrusions protruding radially inwardly are provided on an inner circumferential surface of the inner cylindrical portion, and each of the plurality of axis alignment protrusions is formed between ribs located side by side among the plurality of ribs. The resin forming the inner cylindrical portion is pulled toward the ribs at the time of molding. Even in such a case, since the axis alignment protrusion is formed between the adjoining ribs with less influence, the lenses can be highly accurately housed in the lens barrel by the axis alignment protrusions. Consequently, the high resolution of the lens unit can be attained.

An annular groove may be formed between the inner cylindrical portion and the outer cylindrical portion. In other words, the inner cylindrical portion and the outer cylindrical portion are separated by the annular groove.

The axis alignment protrusions may each include a first axis alignment protrusion and a second axis alignment protrusion, the protruding lengths of which are different from each other. The second axis alignment protrusion may protrude from the first axis alignment protrusion inwardly of the inner circumferential surface, and contact a lens outer circumferential surface. The first axis alignment protrusion may not be circumferentially overlapped with each of the ribs.

The lens barrel may be structured such that a gate indicating a resin injecting position formed at the time of molding the lens barrel is formed in the outer cylindrical portion. The resin injection position (that is, a gate) at the time of molding the lens barrel with resin is separated from the inner cylindrical portion holding the lenses. Therefore, when the resin reaches the inner cylindrical portion from the gate position at the time of molding, the resin flow is sufficiently calm. As a result, deformation due to the magnitude of the resin flow or the disturbance of the resin flow can be inhibited and the roundness can be improved.

End surfaces, on an image side, of the plurality of ribs may each include a positioning portion configured to perform positioning of an electronic member provided with an imaging element.

According to at least an embodiment of the present invention, in a lens unit that is provided with a lens barrel including an inner cylindrical portion and an outer cylindrical portion, if axis alignment protrusions are provided on an inner circumferential surface of the inner cylindrical portion, an influence on the axis alignment protrusions at the time of molding the lens barrel can be inhibited and high resolution of the lens unit can be attained.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1A:
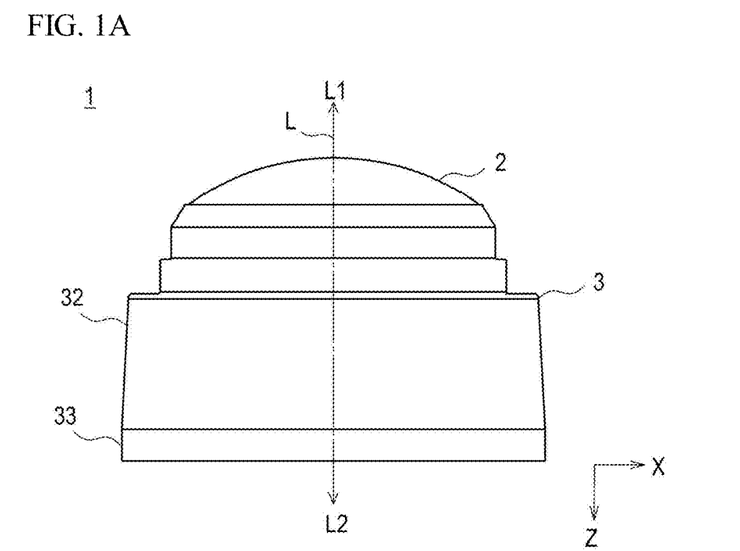
FIG. 1A and FIG. 1B are diagrams illustrating an entire lens unit according to an embodiment.
Figure 1B:
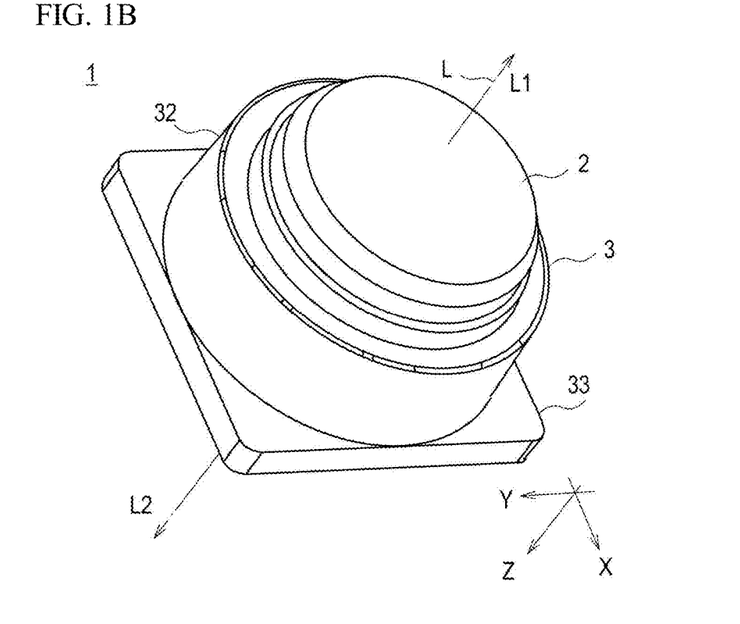
Figure 2:
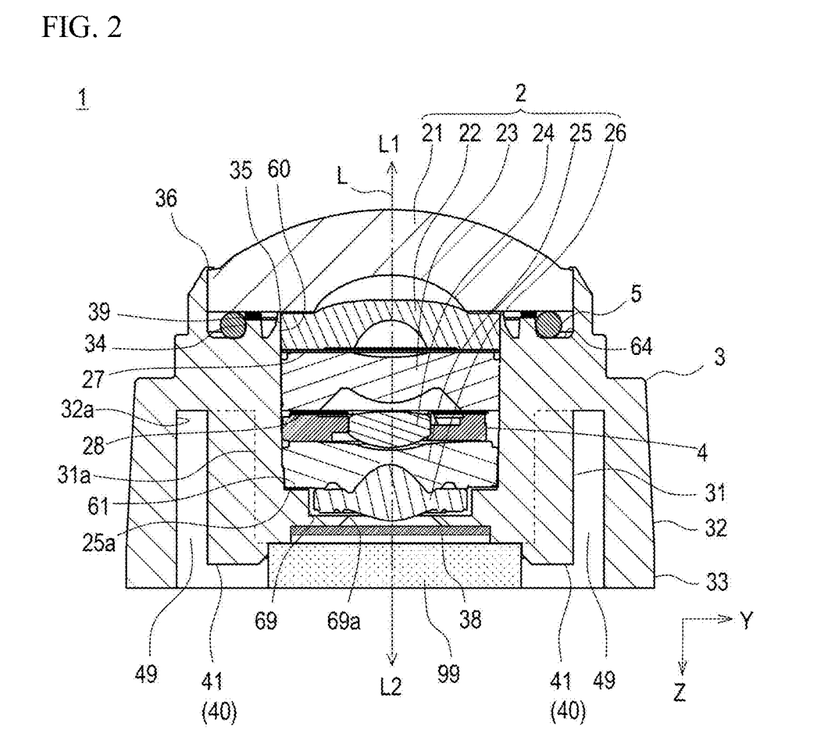
FIG. 2 is a vertical cross-sectional view (Y-Z cross-sectional view) of the lens unit according to the embodiment.

Hereinafter, a mode for carrying out the invention (hereinafter referred to as "embodiment") will be described with reference to the drawings. FIG. 1A and FIG. 1B are diagrams illustrating an entire lens unit 1 according to the present embodiment. FIG. 1A is a front view and FIG. 1B is a perspective view. FIG. 2 is a vertical cross-sectional view corresponding to a Y-Z cross-section as illustrated.

A lens unit 1 is a lens assembly mounted in an on-vehicle peripheral surveillance camera, a surveillance camera, a door phone, or the like. Note that "object side L1" and "image side L2" in the present embodiment are referred to as the object side and the image side in the direction of an optical axis L, and "optical axis direction" means a direction parallel to the optical axis L.

(Overall Configuration)

The lens unit 1 includes a lens group 2 in which a plurality of disk-shaped lenses are coaxially disposed, and a lens barrel 3 configured to house the lens group 2. For example, as illustrated in FIG. 2, the lens group 2 includes six lenses of a first lens 21, a second lens 22, a third lens 23, a fourth lens 24, a fifth lens 25, and a sixth lens 26 disposed in close contact along the optical axis L from the object side L1 to the image side L2.

Of the lenses configuring the lens group 2, the first lens 21 is disposed closest to the object side L1. The second lens 22 is located on the image side L2 of the first lens 21. The third lens 23 is located on the image side L2 of the second lens 22. The fourth lens 24 is located on the image side L2 of the third lens 23. The fourth lens 24 is arranged in the lens barrel 3 while being press-fitted and fixed into a lens holder 4 of resin and being fixedly reinforced with an adhesive. The fifth lens 25 is located on the image side L2 of the fourth lens 24. The sixth lens 26 is located on the image side L2 of the fifth lens 25. The fifth lens 25 and the sixth lens 26 are cemented lens elements and configure a cemented lens. In addition, a light shielding sheet 27 is disposed between the second lens 22 and the third lens 23, and a diaphragm 28 is disposed between the third lens 23 and the fourth lens 24.

A glass lens is used as the first lens 21 from the viewpoint of preventing an object-side lens surface of the first lens 21 from being easily scratched even when the object-side lens surface of the first lens 21 located closest to the object side is exposed. Plastic lenses are used as the second lens 22, the third lens 23, the fifth lens 25, and the sixth lens 26 in terms of superiority in workability and economic efficiency of the lenses. A glass lens is used as the fourth lens 24 from the viewpoint of superiority in optical characteristics such as the surface accuracy of the lens and the refractive index of the lens with respect to temperature change.

An outer circumferential surface of the cemented lens configured by the first lens 21, the second lens 22, the third lens 23, the lens holder 4, the fifth lens 25, and the sixth lens 26 that configure the lens group 2 is supported by an inner circumferential surface 60 of the lens barrel 3 (an inner cylindrical portion 31) and is thus positioned in the optical axis L direction.

A flat portion 25a formed on the periphery of a surface, on the image side L2, of the fifth lens 25, is mounted on an annular flat portion 61 located on the image side L2 inside the lens barrel 3 and extending circumferentially and inwardly. The fourth lens 24, the third lens 23, and the second lens 22 are mounted in the mentioned order above the fifth lens 25 on the flat portion 61. Subsequently, the peripheral edge of a surface, on the object side L1, of the second lens 22, is locked to a swaging portion 35 provided at an end portion, on the object side L1, of the inner circumferential surface 60.

Thus, the second lens 22, the third lens 23, the lens holder 4 (the fourth lens 24), and the fifth lens 25 (and the sixth lens 26 connected to the fifth lens 25) are positioned in the optical axis L direction. Here, from the viewpoint of preventing the second lens 22, the third lens 23, the lens holder 4 (the fourth lens 24), and the fifth lens 25 from being inserted in a wrong order, the closer the lens is located to the image side L2, the smaller the outer diameter is. Thus, the closer the lens is located to the image side L2, the smaller the inner circumferential surface is formed.

A sixth lens housing portion 69 is formed at an end portion (a bottom), on the image side L2, of the inner circumferential surface 60. An opening 69a is formed in the center of the bottom, and an image-side lens surface of the sixth lens 26 is exposed to the image side L2. An infrared cut filter 38 is attached on the image side L2 of the opening 69a, at a position where the infrared cut filter 38 does not contact the sixth lens 26. Additionally, the position of an electronic member 99 provided with imaging elements and the like is determined by locking ribs 41 described below such that the electronic member 99 is provided at a portion adjacent to the image side L2 from the infrared cut filter 38.

An O-ring 5 is disposed in a recess 64 of a stepped portion formed on an upper surface of the lens barrel 3; thereafter, the first lens 21 is disposed above the stepped portion. At this time, the first lens 21 is mounted on a receiving portion 34 formed on the stepped portion in a state where a spacer 39 is provided between the receiving portion and the first lens as needed.

The position of the first lens 21 in a radial direction is adjusted; thereafter, the circumferential end portion of the first lens 21 is swaged from the object side L1 by a swaging portion 36 formed on an end portion, on the object side L1, of the lens barrel 3. Therefore, the first lens 21 is positioned in the optical axis L direction. At this time, the O-ring 5 is compressed and sealed by pressing force toward the image side L2. Consequently, water or the like is inhibited from entering from the outside.

In addition, the lens group 2 of the lens unit 1 according to the present embodiment includes the aforementioned six lenses. Alternatively, the number of lenses is not limited. Further, the materials of the lenses are not limited. Furthermore, the lens group 2 may not include a cemented lens.

(Structural Characteristics of Lens Barrel)

Figure 3:
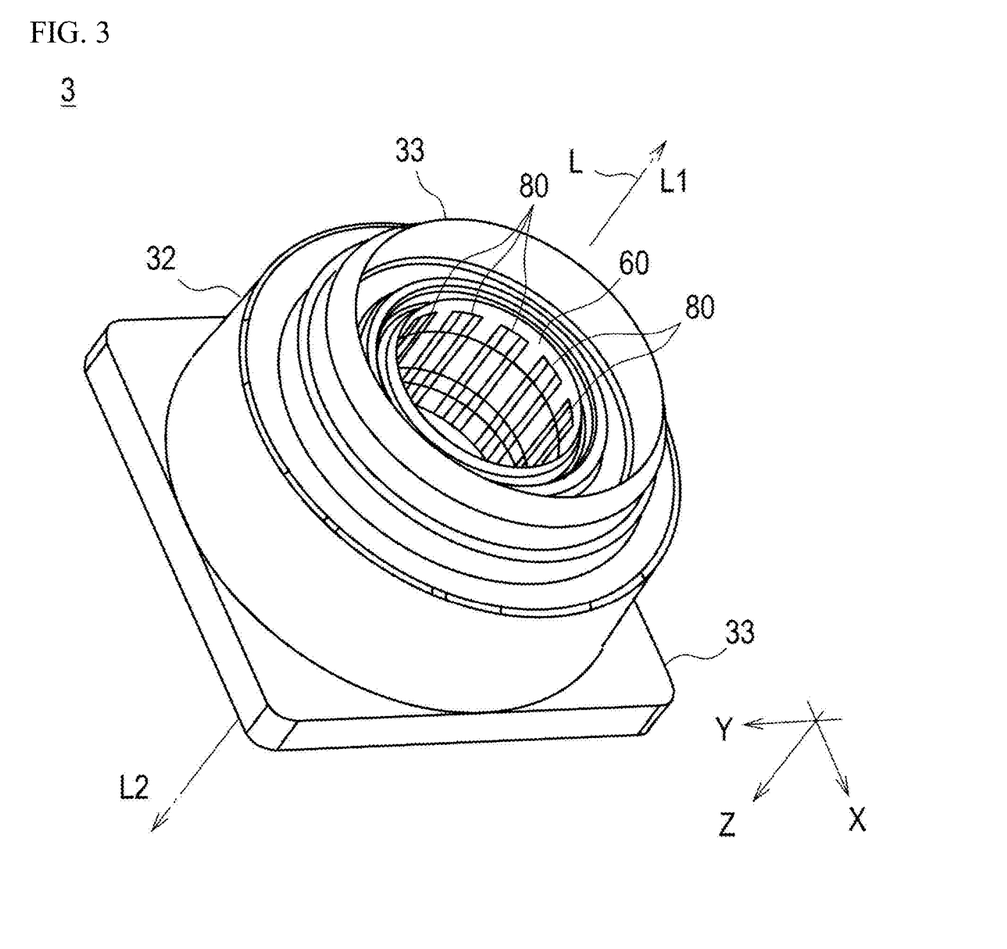
FIG. 3 is a perspective view of a lens barrel according to the embodiment.
Figure 4:
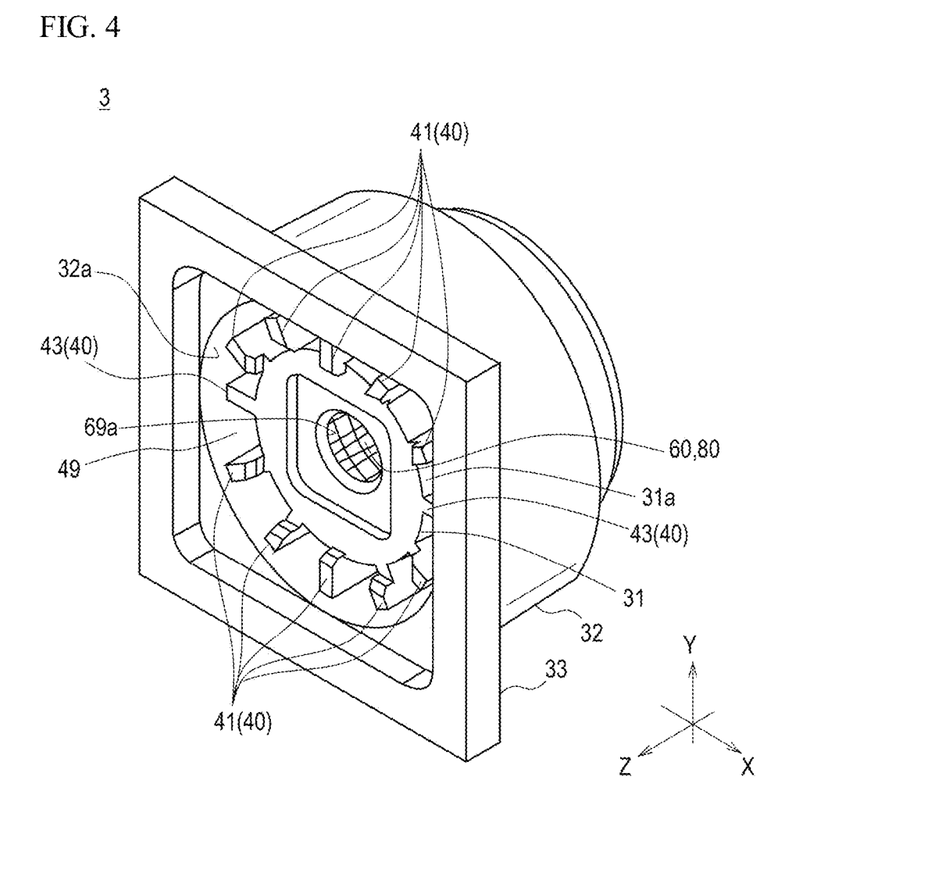
FIG. 4 is a perspective view of the lens barrel according to the embodiment as seen from the bottom side.
Figure 5:
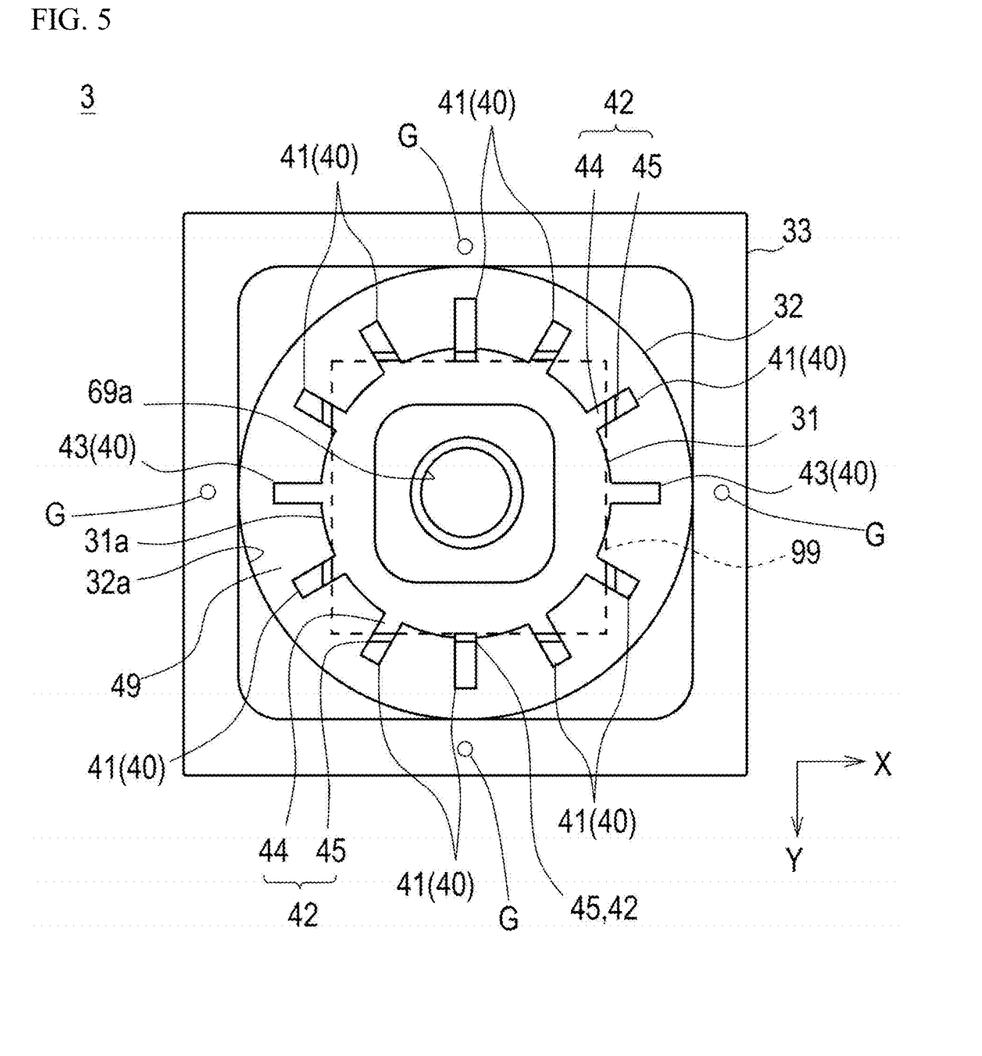
FIG. 5 is a bottom view of the lens barrel according to the embodiment.
Figure 6:
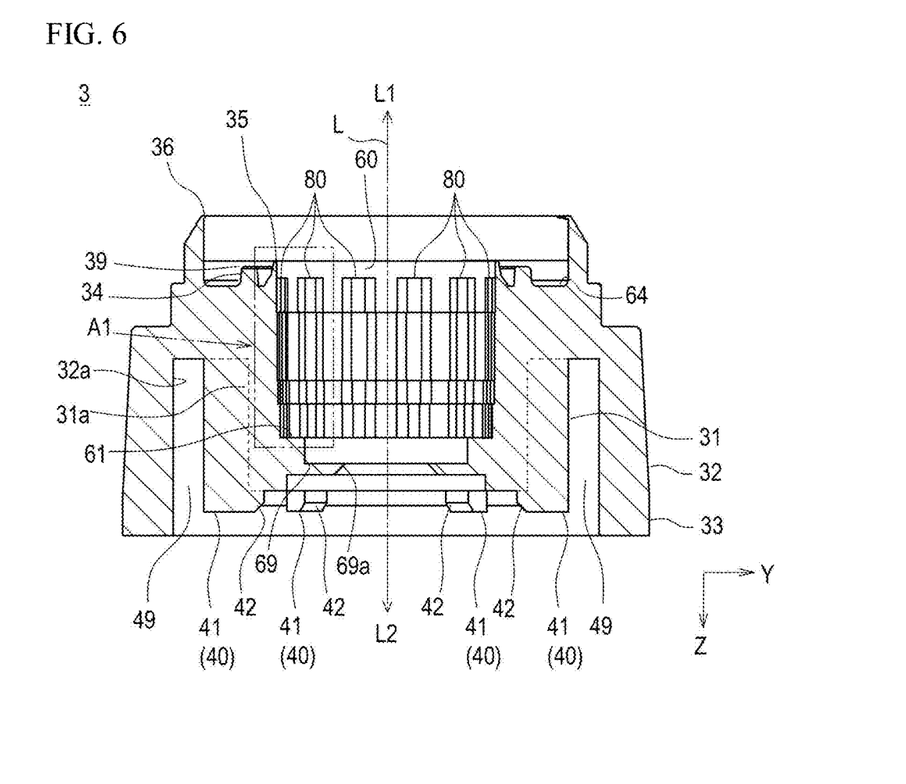
FIG. 6 is a vertical cross-sectional view (Y-Z cross-sectional view) of the lens barrel according to the embodiment.
Figure 7:
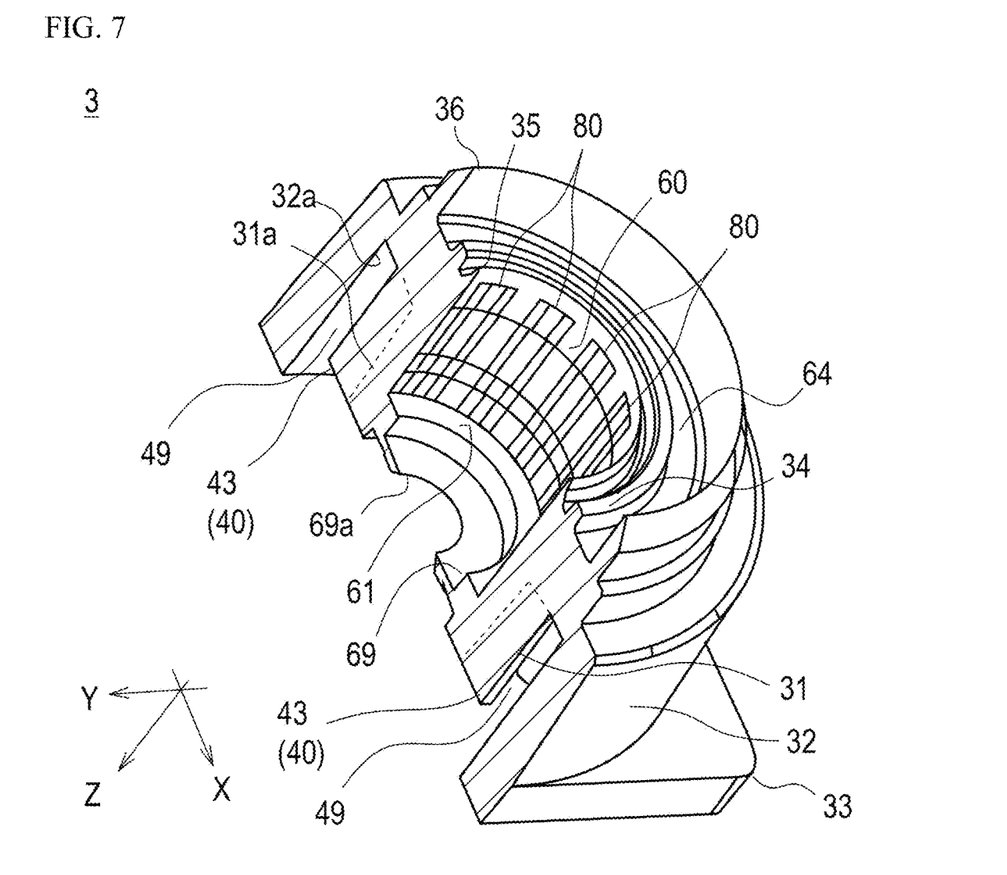
FIG. 7 is a vertical sectional perspective view of the lens barrel according to the embodiment.
Figure 8:
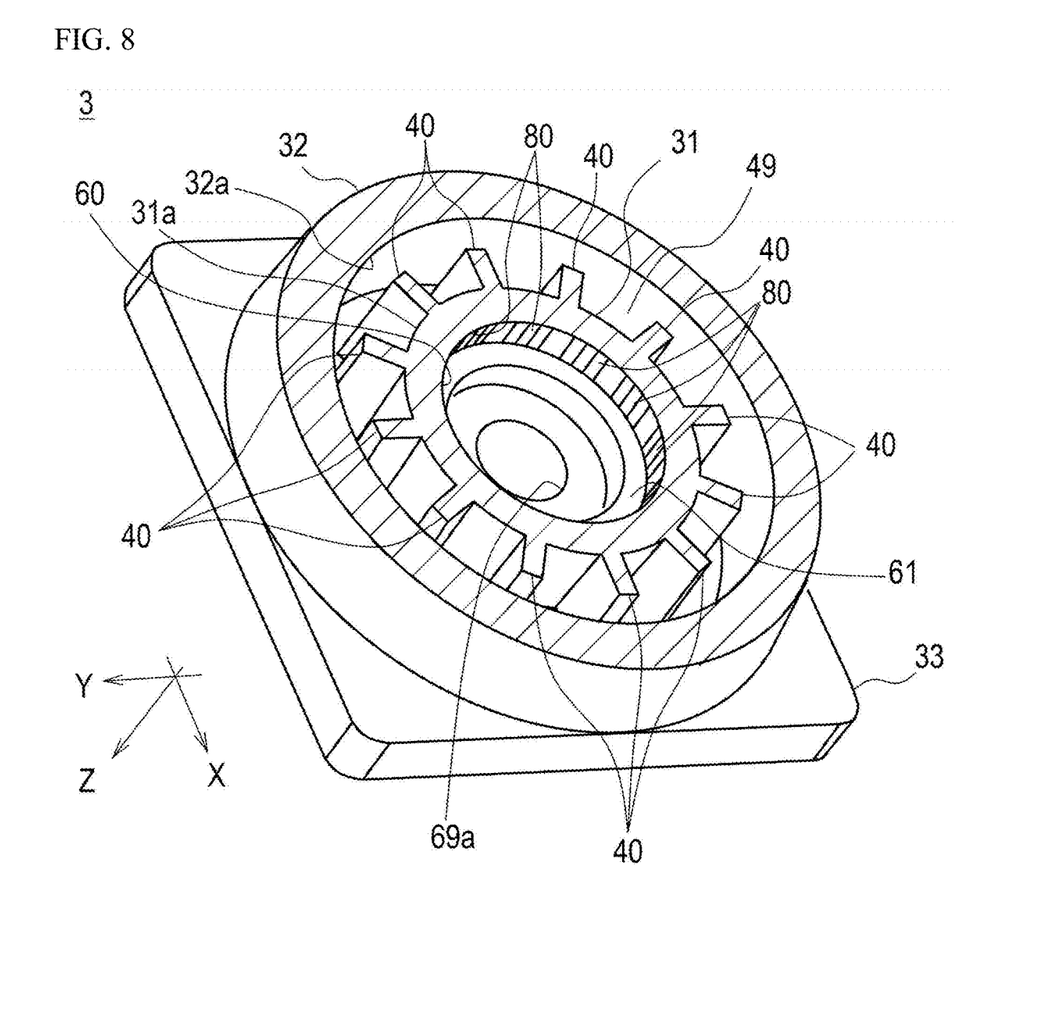
FIG. 8 is a transverse sectional perspective view of the lens barrel according to the embodiment.

Next, regarding the structure of the lens barrel 3, characteristics portions in the present embodiment will be focused and described. FIG. 3 is a perspective view of the lens barrel 3, illustrating the lens barrel 3 in a state after the lens group 2 is removed from the lens unit 1 in perspective view of FIG. 1B. FIG. 4 is a perspective view of the lens barrel 3 as seen from the bottom side. FIG. 5 is a bottom view of the lens barrel 3. FIG. 6 is a Y-Z cross-sectional view of the lens barrel 3, illustrating the lens barrel 3 in a state after the lens group 2 is removed from the lens unit 1 of FIG. 2. FIG. 7 is a cross-sectional perspective view (an X-Z cross-section) of the lens barrel 3. FIG. 8 is an X-Y cross-sectional perspective view.

The lens barrel 3 is a resin cylindrical lens frame, and the inner circumferential surface 60 of the lens barrel 3 is formed extending toward the image side L2 along the outer circumferential surface of each of the lenses configuring the lens group 2. More specifically, the lens barrel 3 includes the inner cylindrical portion 31 on which the inner circumferential surface 60 is formed, an outer cylindrical portion 32 located radially outwardly separated from the inner cylindrical portion 31, and a plurality of ribs 40 (here, twelve ribs) extending in a radial pattern radially outwardly from an outer circumferential surface 31a of the inner cylindrical portion 31.

In the present embodiment, an end portion 33, on the image side L2, of the outer cylindrical portion 32 has an outer shape formed in a substantially square in top view. As illustrated in FIG. 5, four gate marks G are formed at the end portion 33 of the outer cylindrical portion 32 and respectively located in the center of sides of the square. Each of the gate marks G indicates a gate position (gate opening) at the time of resin molding.

In the present embodiment, the lens barrel 3 is molded by injection molding. Resin injecting positions (the gate marks G illustrated in FIG. 5) at the time of injection molding the lens barrel 3 are separated from the inner cylindrical portion 31. With such a structure, when resin reaches the inner cylindrical portion 31 from the gates (that is, the gate marks G) at the time of resin molding, the resin flow is sufficiently calm. As a result, deformation due to the magnitude of the resin flow or the disturbance of the resin flow can be inhibited and the roundness of the inner circumferential surface 60 of the inner cylindrical portion 31 can be improved.

A plurality of axis alignment protrusions 80 (here, twelve axis alignment protrusions) protruding radially inwardly are formed on the inner circumferential surface 60 of the inner cylindrical portion 31. The axis alignment protrusions will be described in detail later. Each of the axis alignment protrusions 80 is formed between the ribs located circumferentially side by side among the plurality of ribs 40.

The inner cylindrical portion 31 and the outer cylindrical portion 32 are separated by an annular groove 49. In other words, the annular groove 49 recessed from the image side L2 is formed between the outer circumferential surface 31a of the inner cylindrical portion 31 and an inner circumferential surface 32a of the outer cylindrical portion 32. For example, as illustrated in FIG. 2, when the lens group 2 is arranged, the deepest portion (that is, a distal end on the object side L1) of the recess of the annular groove is located in the optical axis L direction on the boundary of the third lens 23 and the fourth lens 24, that is, on or above a position in which the diaphragm 28 is disposed.

The plurality of ribs 40 are formed from the outer circumferential surface 31a of the inner cylindrical portion 31 toward the inner circumferential surface 32a of the outer cylindrical portion 32 in the annular groove 49. More specifically, the twelve ribs 40 are formed circumferentially (in X-Y plane) at 30-degree intervals. The ribs 40 include two types of ribs: the locking rib 41 provided with, at an end portion on the image side L2, a positioning portion 42 having a locking shape; and a basic rib 43 not provided with the positioning portion 42. For example, as illustrated in FIG. 4 or FIG. 5, the two ribs extending in a direction parallel to the X axis are the basic ribs 43, and the ten ribs 40 other than the basic ribs 43 are the locking ribs 41.

The electronic member 99 provided with the imaging elements mounted on a substrate, a holding member holding the substrate, and the like is locked and fixed directly or via a spacer to the locking ribs 41. The outer shape of the electronic member 99 is a substantially square in planar view. The eight or more ribs 40 are provided and thereby center portions of sides of the outer shape of the electronic member 99 or portions near corners of the electronic member 99 can be appropriately positioned. As a result, the positional accuracy of the electronic member 99 can be enhanced. In addition, the electronic member 99 can be fixed to an end portion, on the image side L2, of the inner cylindrical portion 31 separated from the outer cylindrical portion 32 (actually, the electronic member 99 can be fixed to the locking ribs 41 of the ribs 40). Consequently, an external impact or the like can be prevented from directly acting on the electronic member 99 and thus failures can be reduced.

Further, the annular groove 49 functions as a lightening hole between the inner cylindrical portion 31 and the outer cylindrical portion 32; therefore, sink marks can be inhibited at the time of molding the lens barrel 3. In other words, the molding accuracy of the lens barrel 3 can be improved and the high resolution of the lens unit 1 can be further attained. Furthermore, the positioning portion 42 for positioning the electronic member 99 is provided on the rib 40; therefore, it is not necessary to provide a member/structure configured to fix the electronic member 99, which leads to reduction of the number of components. Consequently, the assembly work can be simplified and can be performed at low cost.

Moreover, the inner cylindrical portion 31 is reinforced by the plurality of ribs 40; therefore, the strength of the inner cylindrical portion 31 housing the lens group 2 can be ensured. In addition, a resonance phenomenon of the inner cylindrical portion 31 caused by external vibrations can be inhibited. The shape or the like of the rib 40 is adjusted and thus a countermeasure can be taken against various resonances (resonance frequencies).

The positioning portion 42 includes a mounting surface 44 for mounting the electronic member 99 and a protrusion 45 for regulating a radial position. The two locking ribs 41 parallel to the Y axis direction (the locking ribs 41 extending in an up-down direction in FIG. 5) are formed such that only the protrusion 45 is locked to a portion of an end surface, on the image side L2, of the inner cylindrical portion 31. The mounting surface 44, and the end surface, on the image side L2, of the inner cylindrical portion 31 are formed in the same plane. The electronic member 99 is mounted and fixed on the mounting surface 44 and the end surface, on the image side L2, of the inner cylindrical portion 31. The fixed electronic member 99 is positioned by the protrusion 45 in the X-Y plane. In addition, the electronic member 99 may be mounted only on the mounting surface 44.

(Structure of Inner Surface)

Figure 9:
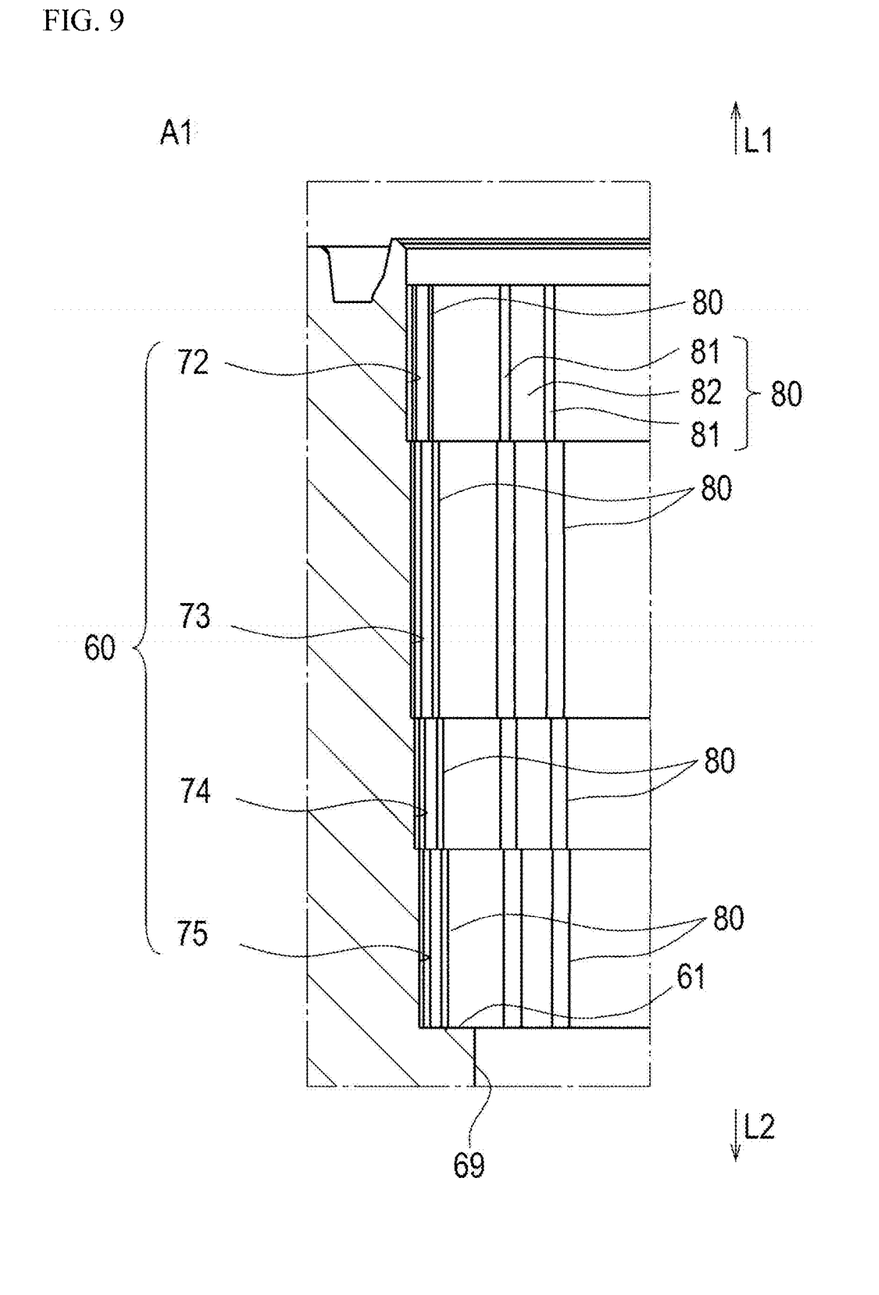
FIG. 9 is an enlarged view of a region A1 of FIG. 6 according to the embodiment.
Figure 10:
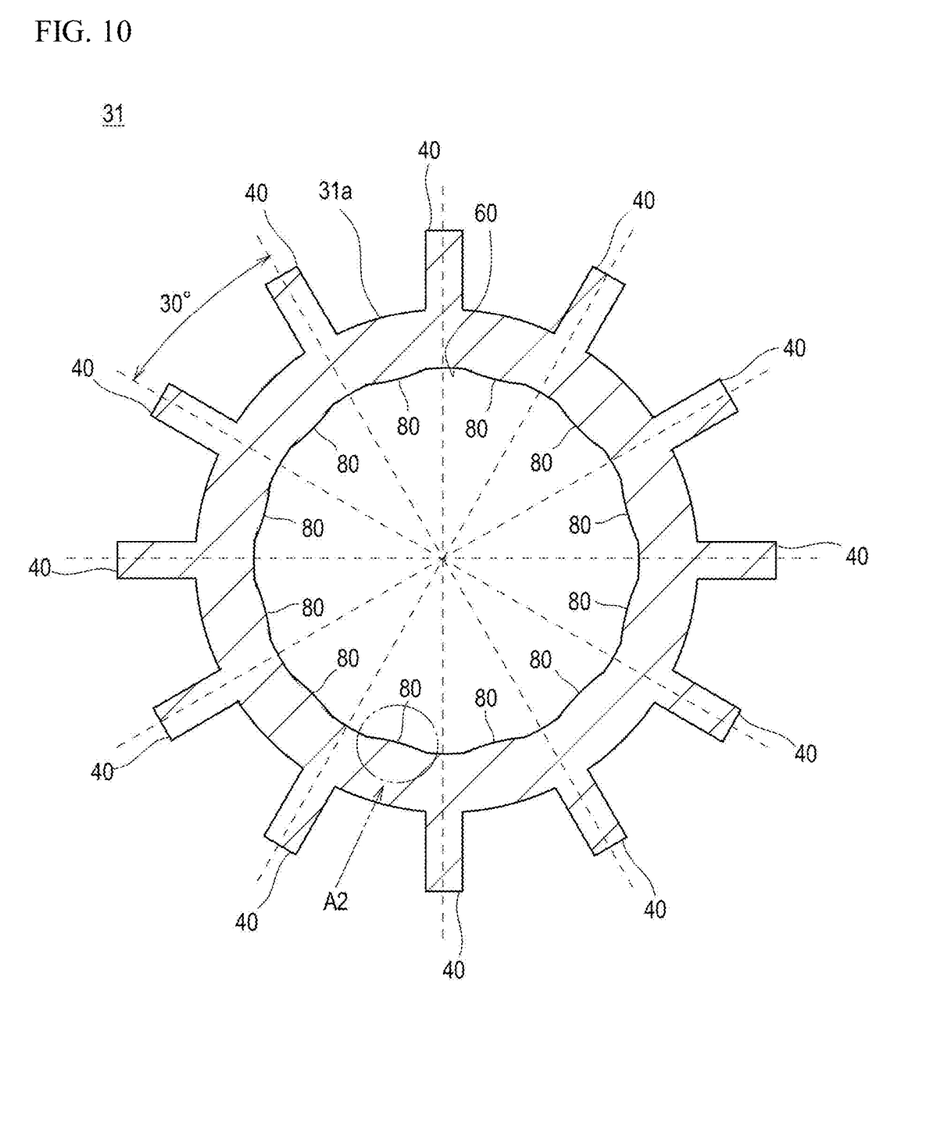
FIG. 10 is a transverse cross-sectional view of an inner cylindrical portion of the lens barrel according to the embodiment.
Figure 11A:
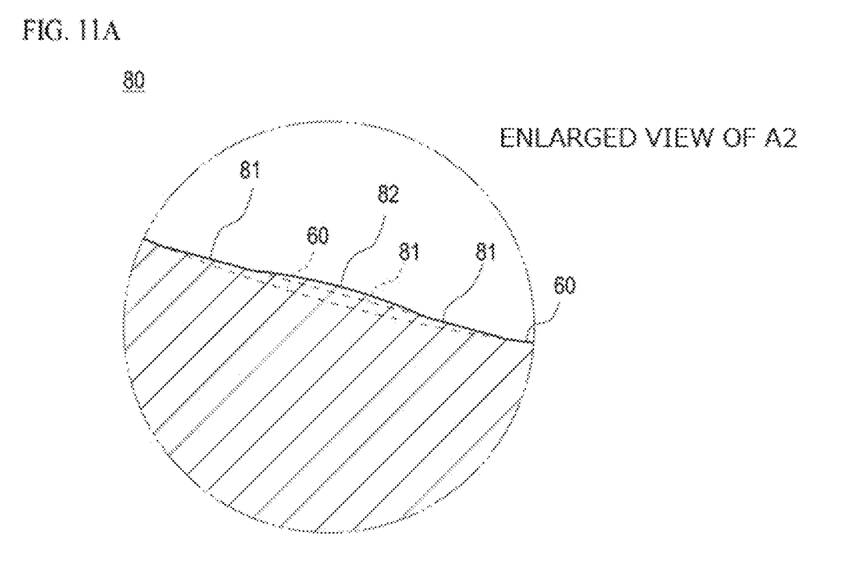
FIG. 11A and FIG. 11B are enlarged views of a region A2 of FIG. 10 according to the embodiment.
Figure 11B:
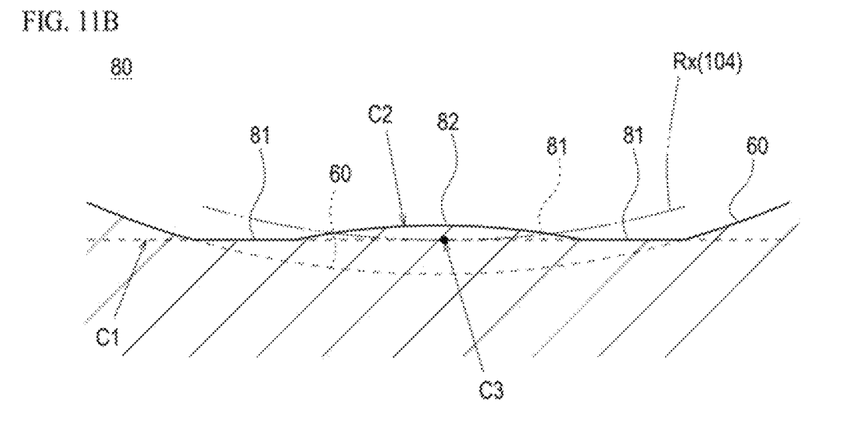
Figure 12A:
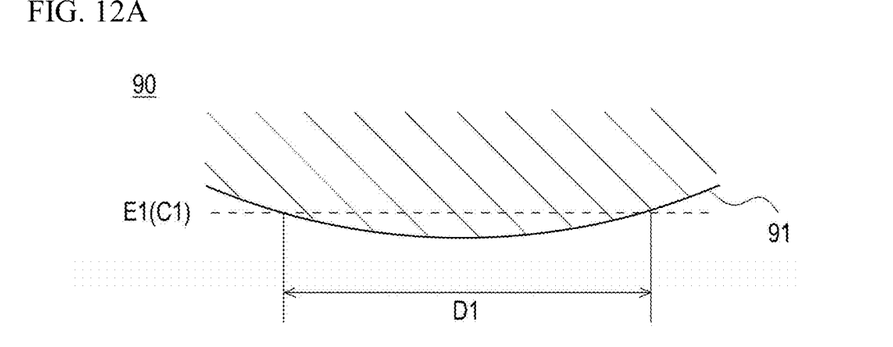
FIG. 12A, FIG. 12B, and FIG. 12C are diagrams illustrating a manufacturing process of a mold according to the embodiment.
Figure 12B:
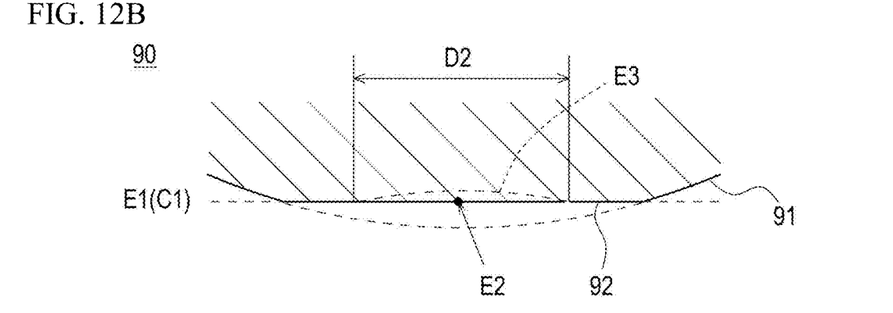
Figure 12C:
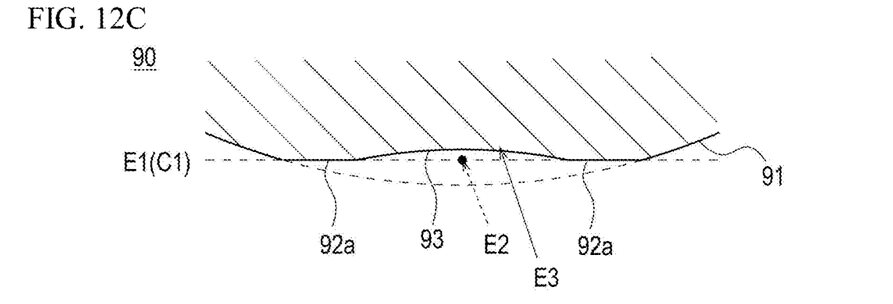

The axis alignment protrusion 80 formed on the inner circumferential surface 60 will be described in detail with reference to FIG. 9 to FIG. 12. FIG. 9 is an enlarged view of a region A1 of FIG. 6. FIG. 10 is a diagram illustrating the inner cylindrical portion 31 in X-Y cross-section. FIG. 11A and FIG. 11B are enlarged views of a region A2, that is, the single axis alignment protrusion 80 of FIG. 10. FIG. 12A, FIG. 12B, and FIG. 12C are diagrams illustrating a process of forming the shape of a lens barrel mold 90 corresponding to the axis alignment protrusion 80.

The inner circumferential surface 60 includes a cylindrical second lens housing portion 72 configured to house the second lens 22, a cylindrical third lens housing portion 73 configured to house the third lens 23, a cylindrical fourth lens housing portion 74 configured to house the fourth lens 24 (actually the lens holder 4), and a cylindrical fifth lens housing portion 75 configured to house the fifth lens 25 from the object side L1 to the image side L2 (for example, from the top to the bottom in FIG. 9).

Of the second to fifth lens housing portions 72 to 75, the outer shape of the second lens housing portion 72 located on the object side L1 is largest corresponding to the outer shape of the foregoing lens, and the outer shape of the lens housing portions gradually decreases toward the image side L2. Each of the second to fifth lens housing portions 72 to 75 includes the axis alignment protrusions 80 circumferentially provided at equal intervals.

As described above, the plurality of axis alignment protrusions 80 are circumferentially formed at equal intervals. Here, the twelve axis alignment protrusions 80 are formed at 30-degree intervals in a protruded shape (bulged shape) protruding radially inwardly. Also, the ribs 40 are formed at 30-degree intervals. In addition, each of the axis alignment protrusions 80 is formed not at a position in which the rib 40 is formed but at a position circumferentially deviated from the rib 40 by 15 degrees; in other words, the axis alignment protrusion 80 is formed between the ribs 40 located side by side.

The axis alignment protrusion 80 includes first axis alignment protrusions 81 protruding (bulging) radially inwardly from the inner circumferential surface 60 and a second axis alignment protrusion 82 radially inwardly from the first axis alignment protrusions 81. Here, the second axis alignment protrusion 82 is formed sandwiched between the two first axis alignment protrusions 81 from right and left sides of the second axis alignment protrusion 82. Thus, the axis alignment protrusion 80 has a two-stage protruding structure with different amounts of protrusion from the inner circumferential surface 60.

As described above, the twelve axis alignment protrusions 80 are provided at 30-degree intervals. Accordingly, for example, in a case where a gate cut portion is provided as in the second lens 22, the third lens 23, the fourth lens 24 (the lens holder 4), and the fifth lens 25, the twelve or more axis alignment protrusions 80 are provided. Thus, even when the axis alignment protrusion 80 is not brought into contact with the gate cut portion, the residual axis alignment protrusions 80 can sufficiently exert an axis alignment function.

Here, in a case where the plurality of ribs 40 extend radially outwardly from the outer circumferential surface 31a of the inner cylindrical portion 31, the resin forming the inner cylindrical portion 31 may be pulled toward the rib 40 at the time of molding. In such a case, the roundness accuracy of the inner circumferential surface 60 of the inner cylindrical portion 31 may be difficult to obtain at a portion near the rib 40. Accordingly, even when the resin forming the inner cylindrical portion 31 is pulled toward the rib 40 at the time of molding, the axis alignment protrusion 80 is formed between the ribs 40 located side by side with less influence. Therefore, the lens group 2 can be housed highly accurately in the lens barrel 3 by the axis alignment protrusions 80. Consequently, the high resolution of the lens unit 1 can be attained.

In addition, in a case where the axis alignment protrusion 80 is formed in any of the second to fifth lens housing portions 72 to 75, the axis alignment protrusion 80 has the same basic structure. However, the fact that the structure of the axis alignment protrusion 80 may vary depending on the structure/shape of a lens to be housed, a manufacturing process of molding components of the lens barrel 3, or the like is easily conceived by those skilled in the art.

The two first axis alignment protrusions 81 protrude inward from the arc-shaped inner circumferential surface 60 but are formed in an identical plane C1. Further, the second axis alignment protrusion 82 having a curved surface C2 in cross-section is formed at the first axis alignment protrusions 81 formed in the plane C1. In other words, the second axis alignment protrusion 82 protrudes as an axially elongated rib extending in parallel to the optical axis direction. Lenses or the like (the second lens 22, the third lens 23, the lens holder 4, and the fifth lens 25) are press-fitted to the second axis alignment protrusion 82, therefore being firmly held by the second axis alignment protrusion 82.

Here, the first axis alignment protrusions 81 are formed of the plane C1. With the twelve first axis alignment protrusions 81 circumferentially formed, more specifically, twelve positions C3, in the plane C1, protruding most inward are on a concentric circle Rx about the optical axis L, that is, on the lens outer circumference. In addition, the amounts of protrusion of the first axis alignment protrusions 81 that are a plurality of flat portions may be different from one another to conform to the target concentric circle Rx. Alternatively, it is not necessary that the concentric circle Rx is always positioned on the lens outer circumference, and for example, an imaginary circle spaced apart by several microns from the lens outer circumference may be applied as the concentric circle Rx.

As described above, the first axis alignment protrusions that are the plurality of flat portions are formed so as to conform to the target concentric circle Rx, and thus the roundness correction is facilitated. In other words, since the first axis alignment protrusions 81 are the flat portions (the plane C1), the standards for manufacturing/modifying molds for manufacturing lens barrels are easily set and accuracy setting is facilitated.

In addition, the first axis alignment protrusions 81 are formed of the plane C1, but not limited thereto. For example, each of the first axis alignment protrusions 81 may be formed in a rib shape having a curved surface in cross-section in the same way as the second axis alignment protrusion 82. In such a case, the shape of the first axis alignment protrusion 81 and the shape of the second axis alignment protrusion 82 satisfy a conditional expression (1), and the first axis alignment protrusion 81 has the curved surface that is sufficiently gentle compared with the curved surface of the second axis alignment protrusion 82.

$$2 \times R2 \leq R1 \quad \text{Conditional expression (1)}$$

R1: radius of curvature of the first axis alignment protrusion 81

R2: radius of curvature of the second axis alignment protrusion 82

The shape of the first axis alignment protrusion 81 and the shape of the second axis alignment protrusion 82 are provided such that the conditional expression (1) is satisfied. Therefore, even in a case where both the first axis alignment protrusion 81 and the second axis alignment protrusion 82 are formed in rib shapes, the position C3 of the first axis alignment protrusion 81, which is on the concentric circle Rx, and the predetermined accuracy can be relatively easily obtained.

(About Mold)

Next, a mold for manufacturing the lens barrel 3 by injection molding, in particular, the lens barrel mold 90 corresponding to the inner circumferential surface 60 and the axis alignment protrusions 80 formed on the inner circumferential surface 60 will be described with reference to FIG. 12A, FIG. 12B, and FIG. 12C. The lens barrel mold 90 is a mold part formed in a column shape (or a cylindrical shape) and having a circular shape in cross-section. The lens barrel mold 90 is arranged inside another mold part including a column-shaped hollow. Then, resin is supplied by injecting in a space between an inner circumferential surface of the mold part and an outer circumferential surface (an inner circumferential surface forming surface 91 for forming the inner circumferential surface 60) of the lens barrel mold 90 and thus the inner circumferential surface 60 is manufactured.

Here, for the mold shape for forming the axis alignment protrusions 80 on the inner circumferential surface 60, as illustrated in FIG. 12C, the lens barrel mold 90 includes a flat portion 92 corresponding to the plane C1 of the first axis alignment protrusion 81 and a recessed curved surface 93 corresponding to the second axis alignment protrusion 82.

First, the lens barrel 3 is manufactured by injection molding with the lens barrel mold 90 on which the shape corresponding to the axis alignment protrusion 80 (the recessed curved surface 93, a flat portion 92a) is not formed. Therefore, the lens barrel 3 (the inner circumferential surface 60) not provided with the axis alignment protrusions 80 (the first axis alignment protrusions 81, the second axis alignment protrusions 82) is molded. With the lens barrel 3 in a state as just described, the roundness of the inner circumferential surface 60 is measured and analyzed. In other words, as illustrated in FIG. 12A, a region D1 in the inner circumferential surface forming surface 91 to be cut along a plane E1 is determined. The region D1 to be cut, that is, the amount of protrusion of the first axis alignment protrusion 81 corresponding to the region D1 may be different for each of the first axis alignment protrusions 81.

Next, the foregoing region D1 is cut out, and then, as illustrated in FIG. 12B, the flat portion 92 is formed on the inner circumferential surface forming surface 91. A center portion E2 of the cut portion of the inner circumferential surface forming surface is positioned on an imaginary concentric circle of a target lens (in FIG. 11B, the outer circumference of the lens, that is, the concentric circle Rx). The twelve flat portions 92 are formed circumferentially at equal intervals, at 30-degree intervals as in the foregoing example.

Subsequently, as illustrated in FIG. 12C, the recessed curved surface 93 formed in a circular arc E3 axially elongated in cross-section is vertically formed on the center of the flat portion 92. Therefore, the flat portion 92 is divided into the two flat portions 92a between which the recessed curved surface 93 is interposed. The recessed curved surface 93 corresponds to the second axis alignment protrusion 82.

In addition, the depth of the recessed curved surface 93, that is, the amount of protrusion of the second axis alignment protrusion 82 to which a lens is slightly press-fitted is identical in all of the second axis alignment protrusions 82.

The flat portion 92 of a plane is formed on the lens barrel mold 90 in the process as just described; therefore, references are easily set and processing is easily performed. Consequently, a predetermined imaginary concentric circle is easily obtained. In other words, it is difficult and takes time to adjust accuracy in roundness correction where the position of an imaginary concentric circle of a lens and a slight press-fitting structure are attained only by ribs. However, in the present embodiment, accuracy adjustment can be facilitated and the time taken for accuracy adjustment can be significantly reduced.

The features of the present embodiment are summarized as follows. The lens unit 1 includes the plurality of lenses (the lens group 2) and the lens barrel 3 configured to house the plurality of lenses (the lens group 2). The lens barrel 3 includes the inner cylindrical portion 31 configured to house the lens group 2, the outer cylindrical portion 32 separated radially outwardly from the inner cylindrical portion 31, and the plurality of ribs 40 extending in a radial pattern radially outwardly from the outer circumferential surface 31a of the inner cylindrical portion 31. The plurality of axis alignment protrusions 80 protruding radially inwardly are provided on the inner circumferential surface 60 of the inner cylindrical portion 31. Each of the plurality of axis alignment protrusions 80 is formed between the ribs 40 located side by side among the plurality of ribs 40. In the lens unit 1 configured as just described, the resin forming the inner cylindrical portion 31 is pulled toward the rib 40 at the time of molding the lens barrel 3. Even in such a case, since the axis alignment protrusion 80 is formed between the adjoining ribs 40 with less influence, the lens group 2 can be highly accurately housed in the lens barrel 3. Consequently, the high resolution of the lens unit 1 can be attained.

The annular groove 49 is formed between the plurality of ribs 40 and the outer cylindrical portion 32. In other words, the inner cylindrical portion 31 and the outer cylindrical portion 32 are separated by the annular groove 49.

The axis alignment protrusion 80 includes the first axis alignment protrusions 81 and the second axis alignment protrusion 82, the protrusion lengths of which are different from each other. The second axis alignment protrusion 82 protrudes inward of the inner circumferential surface 60 from the first axis alignment protrusions 81, and is brought into contact with the lens outer circumferential surface (the outer circumferential surface of each of the first lens 21, the second lens 22, the third lens 23, the lens holder 4, and the fifth lens 25). The first axis alignment protrusion 81 is not circumferentially overlapped with the rib 40.

The lens barrel 3 is structured such that the gates indicating the resin injecting positions formed at the time of injection-molding the lens barrel 3 are formed in the outer cylindrical portion 32. The resin injection positions (that is, the gate marks G) at the time of resin molding are separated from the inner cylindrical portion 31. Therefore, when resin reaches the inner cylindrical portion 31 from the gate marks G, the resin flow is sufficiently calm. As a result, deformation due to the magnitude of the resin flow or the disturbance of the resin flow can be inhibited and the roundness of the inner circumferential surface 60 of the inner cylindrical portion 31 can be improved.

The image-side end surface of each of the plurality of ribs 40 includes the positioning portion 42 configured to perform positioning of the electronic member 99 provided with the imaging elements. In the foregoing embodiment, the positioning portion 42 is provided at the end portion of the locking rib 41 of the rib 40. The electronic member 99 can be fixed to the end portion, on the image side L2, of the inner cylindrical portion 31 separated from the outer cylindrical portion 32 (actually, the electronic member 99 can be fixed to the locking rib 41 of the rib 40). Consequently, an external impact or the like can be prevented from directly acting on the electronic member 99 and thus failures can be reduced.

As described above, the present invention is described based on the embodiment. The embodiment is illustrated as merely an example. It will be understood by those skilled in the art that various modified examples can be made, for example, by combination of components of the embodiment and that the modified examples are within the scope of the present invention.

Figure 13:
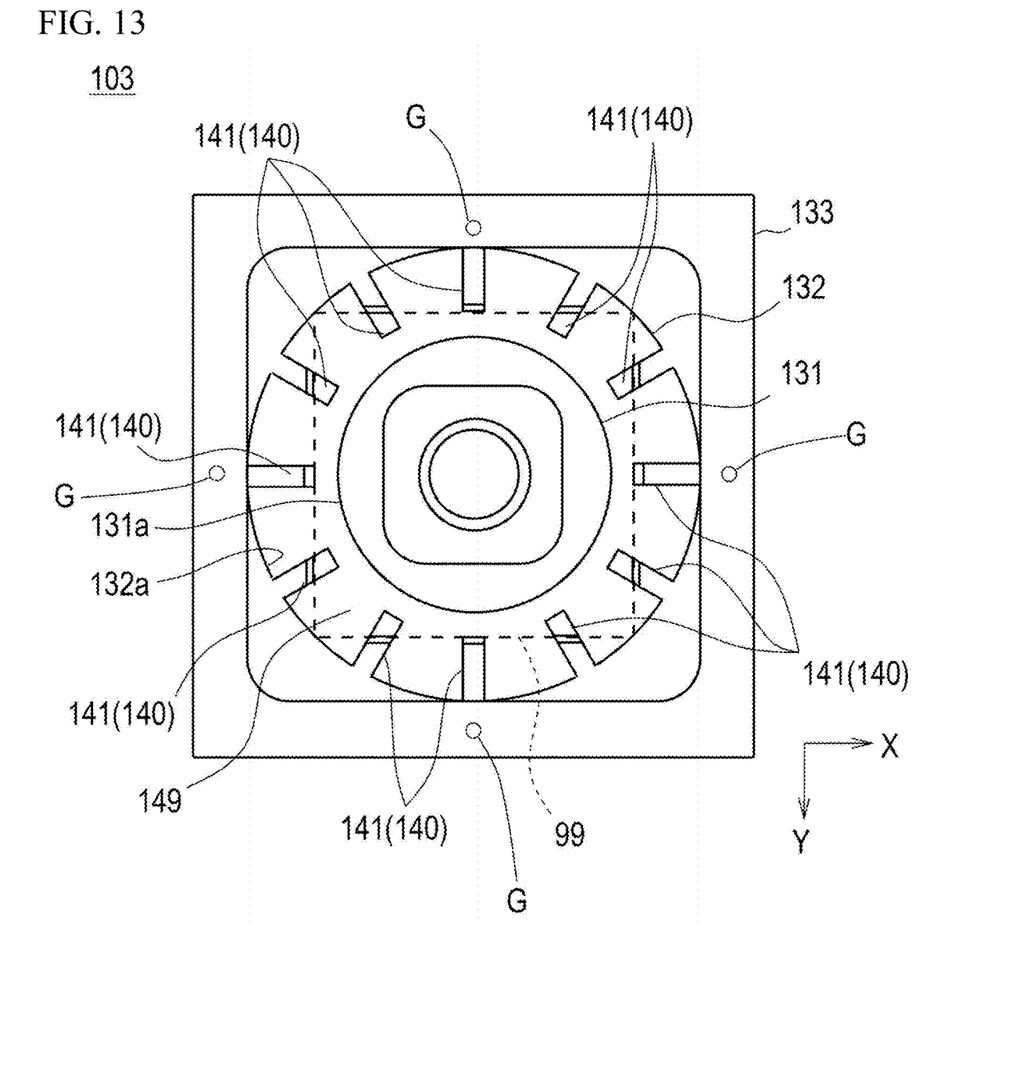
FIG. 13 is a bottom view of a lens barrel according to a modified example.

FIG. 13 is a rear view of a lens barrel 103 of a modified example and corresponds to the foregoing lens barrel of FIG. 5. The lens barrel of the modified example is different from that of the foregoing embodiment in that ribs 140 are formed extending from an outer cylindrical portion 132 toward an inner cylindrical portion 131. Specifically, annular groove 149 is formed between an outer circumferential surface 131a of the inner cylindrical portion 131 and an inner circumferential surface 132a of the outer cylindrical portion 132. The ribs 140 are formed from the inner circumferential surface 132a of the outer cylindrical portion 132 toward the inner cylindrical portion 131. The ribs 140 are separated from the outer circumferential surface 131a of the inner cylindrical portion 131 without contacting the outer circumferential surface 131a.

The ribs 140 are each a locking rib 141 used to lock/fix the electronic member 99. Gate marks G are formed in an end portion 133, on the image side L2, of the outer cylindrical portion 132. Depending on the structure/size of the electronic member 99 to be attached, a positioning portion 142 of the locking rib 141 includes both or one of the mounting surface 44 and the protrusion 45 that have the same structure as that described in the embodiment. A lens unit including the lens barrel 103 as just described is structured such that a direct influence on the inner cylindrical portion 131 can be excluded when the electronic member 99 is fixed to the outer cylindrical portion 132. Therefore, the lens group 2 attached to the lens barrel 3 is prevented from being misaligned.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens unit, comprising:
   a plurality of lenses; and
   a lens barrel which is made of resin and is molded by injection molding, the lens barrel comprising:
   an inner cylindrical portion in which the plurality of lenses are housed,
   an outer cylindrical portion separated radially outwardly from the inner cylindrical portion, and
   a plurality of ribs extending in a radial pattern from an outer circumferential surface of the inner cylindrical portion toward an inner circumferential surface of the outer cylindrical portion,
   wherein a gate indicating a resin injecting position formed at a time of molding the lens barrel is formed in the outer cylindrical portion,
   wherein a plurality of axis alignment protrusions protruding radially inwardly is provided on an inner circumferential surface of the inner cylindrical portion,
   each of the axis alignment protrusions comprises a first axis alignment protrusion and a second axis alignment protrusion,
   the first axis alignment protrusion is formed of a plane which is protruded radially inwardly from the inner circumferential surface of the inner cylindrical portion,
   the second axis alignment protrusion is protruded radially inwardly from the plane of the first axis alignment protrusion so as to have a curved surface in cross-section,
   the curved surface of the second axis alignment protrusion on the plane of the first axis alignment protrusion contacts a lens outer circumferential surface, and
   the first axis alignment protrusion is not circumferentially overlapped with each of the ribs.

2. The lens unit according to claim 1, wherein an annular groove is formed between the inner cylindrical portion and the outer cylindrical portion.

3. The lens unit according to claim 1, wherein the gate is formed in an end portion, on an image side, of the outer cylindrical portion.

4. The lens unit according to claim 1, wherein end surfaces, on an image side, of the plurality of ribs each comprise a positioning portion configured to perform positioning of an electronic member provided with an imaging element.

5. The lens unit according to claim 2, wherein end surfaces, on an image side, of the plurality of ribs each comprise a positioning portion configured to perform positioning of an electronic member provided with an imaging element.

* * * * *